United States Patent
David et al.

(10) Patent No.: US 10,703,243 B2
(45) Date of Patent: Jul. 7, 2020

(54) VIBRATING WARNING DEVICE FOR A VEHICLE SEAT

(71) Applicant: PSA Automobiles SA, Poissy (FR)

(72) Inventors: Eric David, Chatenay Malabry (FR); Gael Hansen, Bois d'Arcy (FR)

(73) Assignee: PSA Automobiles SA, Poissy (FR)

( * ) Notice: Subject to any disclaimer, the term of this patent is extended or adjusted under 35 U.S.C. 154(b) by 0 days.

(21) Appl. No.: 16/613,736

(22) PCT Filed: May 17, 2018

(86) PCT No.: PCT/FR2018/051199
§ 371 (c)(1),
(2) Date: Nov. 14, 2019

(87) PCT Pub. No.: WO2018/220310
PCT Pub. Date: Dec. 6, 2018

(65) Prior Publication Data
US 2020/0070701 A1    Mar. 5, 2020

(30) Foreign Application Priority Data
Jun. 2, 2017 (FR) ..................... 17 54956

(51) Int. Cl.
*B60N 2/90* (2018.01)
*B60Q 9/00* (2006.01)
(Continued)

(52) U.S. Cl.
CPC .............. *B60N 2/90* (2018.02); *B60N 2/646* (2013.01); *B60Q 9/00* (2013.01); *B60R 16/03* (2013.01); *B60N 2002/981* (2018.02)

(58) Field of Classification Search
CPC .... B60N 2/90; B60N 2/646; B60N 2002/981; B60N 2/00; B60N 2/44; B60R 16/03; B60Q 9/00; A47C 31/00
(Continued)

(56) References Cited

U.S. PATENT DOCUMENTS 5,067,772 A * 11/1991 Koa .................. A47C 7/185
297/229
6,682,494 B1 * 1/2004 Sleichter, III .......... A61H 23/02
601/57
(Continued)

FOREIGN PATENT DOCUMENTS

| DE | 102015005636 A1 | 11/2016 |
|---|---|---|
| EP | 2849930 A1 | 3/2015 |
| WO | 2003011638 A1 | 2/2003 |

OTHER PUBLICATIONS

International Search Report for PCT/FR2018/051199 dated Sep. 18, 2018.
Written Opinion for PCT/FR2018/051199 dated Sep. 18, 2018.

*Primary Examiner* — Nam V Nguyen
(74) *Attorney, Agent, or Firm* — Sandberg Phoenix & von Gontard, P.C.

(57) ABSTRACT

The invention relates to a vibrating warning device for a vehicle seat, having a vibrating patch (31) intended to be attached to the upper face of the padding of the seat part or backrest of one said seat, said patch (31) comprising at least one electrically controlled vibratory actuator (32) accommodated in a flexible support jacket (33); characterized in that said flexible support jacket (33) has a main body (34) enclosing said vibratory actuator(s) (32), and at least two arms (39) extending from said main body (34), on either side of the latter, and each comprising a retaining hook (40)
(Continued)

intended to engage with a corresponding recess made in said padding in order to keep said main body (34) against the upper face of this padding.

10 Claims, 2 Drawing Sheets

(51) Int. Cl.
*B60N 2/64* (2006.01)
*B60R 16/03* (2006.01)

(58) Field of Classification Search
USPC ............ 340/407.1, 575, 576, 7.6, 903, 435; 601/47, 57; 701/49; 297/217.1, 217.3
See application file for complete search history.

(56) References Cited

U.S. PATENT DOCUMENTS

| | | | |
|---|---|---|---|
| 7,681,949 B2 * | 3/2010 | Nathan | B06B 3/00 |
| | | | 297/217.3 |
| 7,714,701 B2 * | 5/2010 | Altan | B60Q 9/008 |
| | | | 340/407.1 |
| 8,269,614 B2 * | 9/2012 | Kerstan | B60W 50/16 |
| | | | 340/407.1 |
| 8,678,500 B2 * | 3/2014 | Lem | B60N 2/914 |
| | | | 297/284.6 |
| 8,686,940 B2 * | 4/2014 | Nathan | G06F 3/016 |
| | | | 345/156 |
| 9,286,773 B2 * | 3/2016 | McQueen | G08B 6/00 |
| 9,573,522 B2 * | 2/2017 | James | B60Q 9/00 |
| 9,978,226 B1 * | 5/2018 | Mankame | B60N 2/986 |
| 9,987,962 B1 * | 6/2018 | Salter | B60N 2/90 |
| 10,214,128 B2 * | 2/2019 | Rockwell | B60N 2/7017 |
| 2007/0241592 A1 * | 10/2007 | Griffin | B60N 2/5635 |
| | | | 297/180.1 |
| 2012/0187728 A1 * | 7/2012 | Lazanja | B60N 2/5635 |
| | | | 297/180.12 |
| 2013/0342366 A1 * | 12/2013 | Kiefer | G08B 6/00 |
| | | | 340/901 |
| 2014/0008948 A1 | 1/2014 | Rockwell et al. | |
| 2014/0346823 A1 * | 11/2014 | Stebbins | B60N 2/986 |
| | | | 297/217.1 |
| 2015/0032037 A1 * | 1/2015 | Nakano | B60N 2/7094 |
| | | | 601/46 |
| 2015/0197173 A1 * | 7/2015 | Hulway | B60N 2/99 |
| | | | 297/284.9 |
| 2016/0347329 A1 * | 12/2016 | Zelman | B60W 50/16 |

* cited by examiner

VIBRATING WARNING DEVICE FOR A VEHICLE SEAT

CROSS-REFERENCE TO RELATED APPLICATIONS

This application is the US National Stage under 35 USC § 371 of International Application No. PCT/FR2018/051199, filed 17 May 2018 which claims priority to French Application No. 1754956 filed 2 Jun. 2017, both of which are incorporated herein by reference.

FIELD OF THE INVENTION

The present invention deals with a device suitable for transmitting to only the driver of a vehicle a piece of information warning him of an external event related to the driving of the vehicle, without disturbing the comfort of the other occupants or the environment in which they find themselves in the passenger compartment of the vehicle.

It relates more particularly to a vibrating warning device for a motor vehicle seat and to a seat pad or seat backrest pad comprising a warning device of this type.

BACKGROUND OF THE INVENTION

Current motor vehicles comprise, in ever more sophisticated practical implementations, various means that warn the driver of events linked or related to the driving of the vehicle, for example, but in a non-limiting manner, of a permitted speed limit being exceeded, of an overspeed in the rotational speed of the motor in a given ratio of the gearbox, of the detection of the presence of another vehicle at the blind spot angle of the driver at the moment when his vehicle pulls out to overtake another car travelling in front of it or to pass some obstacle, of overstepping a continuous line of ground marking in the center of the roadway in some surface configurations, of a visibility limitation necessitating lighting the head lights of the vehicle, of a call on a hands-free car mobile telephone, or indeed of any other external reason whose sudden or gradual appearance requires an appropriate reaction from the driver.

It is in particular well known to generate, in response to an external event of this type, a vibratory alarm signal intended to warn the driver.

International patent application WO 2003/011638 discloses a vibrating warning device for a motor vehicle seat comprising an electric motor that is housed in a housing and that drives a rotation axle.

This axle has an extension that protrudes from the housing and on which a flyweight is mounted that consists of a heavy element fixed eccentrically on the axis so as to create an unbalance when the axis is driven in rotation by the motor.

Driving the unbalance in rotation brings about mechanical vibrations, the amplitude of which is a function of the driving speed of the axis of this motor.

The warning device is installed under the cover of the seat and is fixed to the cover via a flange that is held by screws so as to confine a metal thread of this seat cover between this flange and a flexible insert in contact with the housing of the motor.

Because of its positioning being somewhat spaced from the occupant of the seat, this type of device has to have a high vibrational power, leading to a rather high cost price and a significant increase in the total mass of the seat.

Moreover, because of its relatively large dimensions, it is at risk of being damaged by the occupant of the seat located behind the driver's seat if the occupant slides his feet below the seat.

To overcome these drawbacks, a vibrating warning device is known, in particular from US Pub. No. 2014/0008948, comprising a vibrating patch intended to be fixed by gluing to the padding of the seat or backrest of a motor vehicle seat.

This patch comprises a plurality of vibratory actuators of the LRA (linear resonant actuator) or ERM (eccentric rotating mass actuator) type interconnected in series or in parallel, these actuators being confined in a flexible support jacket formed by the two portions, which are folded onto themselves and glued together by a textile film.

To prevent, in particular, the patches mounted on the padding from detaching as a result of the repeated strains exerted on them when the occupant sits down and gets up from the seat, housings have to be specifically arranged in this padding to receive them, and this spaces them apart from the driver and reduces the vibration sensation performance.

OBJECT AND SUMMARY OF THE INVENTION

The present invention therefore aims to improve the situation.

For this purpose, a vibrating warning device for a vehicle seat is disclosed, the warning device having a vibrating patch intended to be attached to the upper face of the padding of the seat or backrest of one seat, the patch comprising at least one electrically controlled vibratory actuator accommodated in a flexible support jacket;

wherein the flexible support jacket has a main body enclosing the at least one vibratory actuator, and at least two arms extending from the main body, on either side of the body, and each comprising a retaining hook intended to be introduced into a corresponding recess made in the padding in order to keep the main body against the upper face of this padding.

The presence of these retaining hooks makes it possible to obtain excellent holding of the main body accommodating the at least one vibratory actuator against the upper face of the padding of the seat or seat backrest, so as to limit the risks of the patch being displaced and/or bent as a result of the repeated strains exerted on it when the occupant sits down and gets up from the seat.

The warning device further has the advantage of being particularly simple and quick for an operator to install (or to remove in the event of malfunction).

In accordance with preferred features of the device, taken alone or in combination:

each retaining hook has a T-shaped profile and comprises a central core extending in the extension of a corresponding arm as well as two side branches projecting symmetrically from the free end of this core on either side thereof;

the jacket further comprises a cover extending in the extension of the main body and provided to pass through an opening made in the thickness of the padding, the cover confining a plurality of conductors connecting the at least one vibratory actuator to a power cable intended to be installed under the padding;

the power cable carries, on the end thereof opposite the cover, a connector that makes it possible to implement the connection of the warning device to an electric control module installed in the vehicle;

the jacket is formed of a thermoplastic material;

the jacket is made from two thermoplastic films, which are superimposed so as to sandwich the at least one vibratory actuator and hot-pressed to weld them together and cause them to deform so as to create a housing confining the at least one vibratory actuator;

the patch comprises a plurality of the at least one vibratory actuator confined in the main body and electrically connected in series and/or in parallel by connectors; and/or the at least one vibratory actuator is of the electromechanical polymer (EMP) type.

In a second aspect, a seat pad or backrest pad of a vehicle seat is provided which comprises a padding covered with a cover lining, wherein the seat comprises at least one warning device as described above, in which the main body of the patch is sandwiched between the upper face of the padding and the cover lining, the padding further having a plurality of recesses each engaging with one of the retaining hooks to hold the main body against the upper face of the padding.

In accordance with an advantageous feature, the cover lining comprises an external surfacing and an internal foam layer brought up against the lower face of the external surfacing to improve the comfort of the occupant of the seat, preventing the presence of the patch from bothering him.

BRIEF DESCRIPTION OF THE DRAWINGS

The disclosure of the invention will now be continued with the detailed description of an exemplary embodiment, given hereinafter in an illustrative but non-limiting manner, with reference to the accompanying drawings, in which.

DETAILED DESCRIPTION OF AN EMBODIMENT

Figure 1:
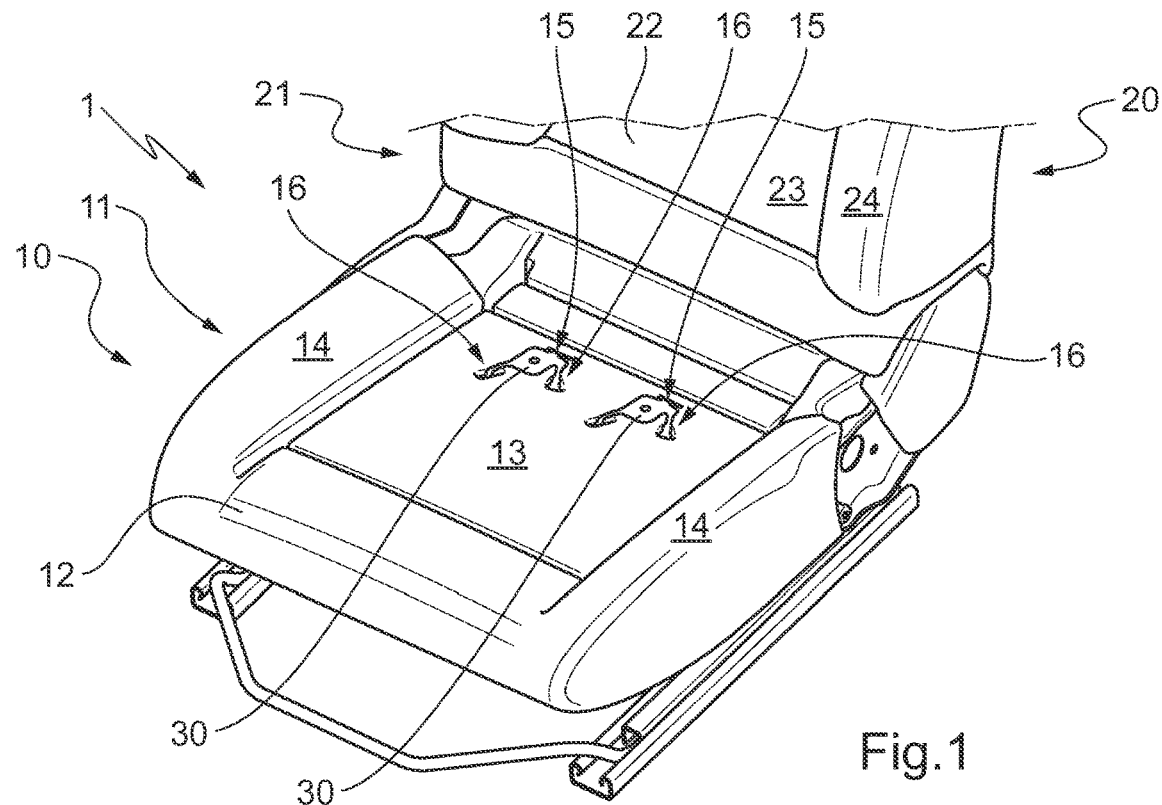
FIG. 1 is a partial perspective view of a motor vehicle seat, the seat pad of which integrates two vibrating warning devices according to the invention.

FIG. 1 is a partial perspective view of a motor vehicle seat 1 comprising a seat 10 on which a backrest 20, is mounted pivotably about a transverse axis, and on top of which a headrest (not shown) is optionally mounted.

As is shown in the exploded view of FIG. 1, the seat 10 and the backrest 20 each comprise a pad 11, 21 fixed to a generally metal corresponding frame.

Figure 3:
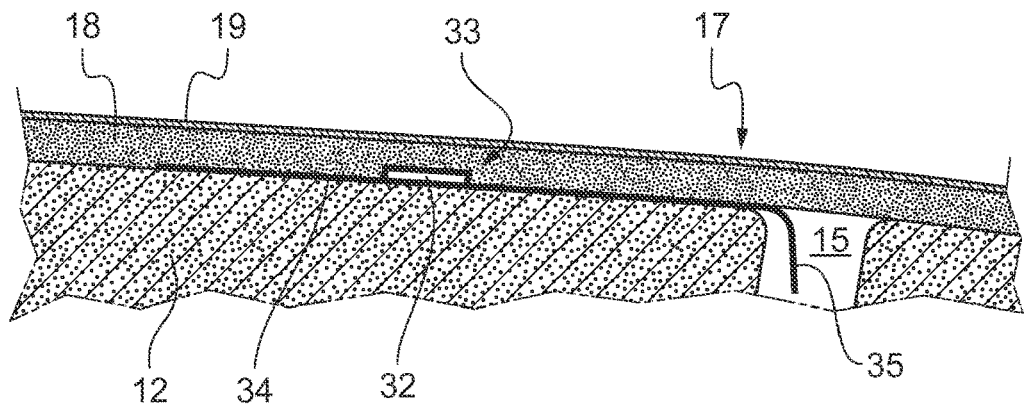
FIG. 3 is a partial longitudinal sectional view of the seat pad of the seat of FIG. 1, taken at the level of a warning device.
Figure 4:
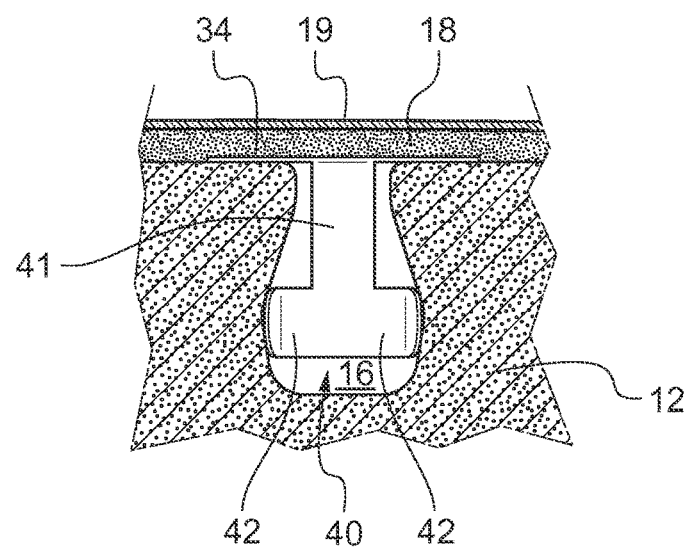
FIG. 4 is a partial cross-sectional view of the seat pad of the seat of FIG. 1, taken at the level of a recess in the padding that receives one of the retaining hooks of a warning device.

Each pad 11, 21 comprises an internal padding 12, 22 generally comprising a molded polyurethane foam block and covered by a cover lining (these not being shown in FIG. 1 for ease of comprehension of the invention, only the lining 17 of the seat pad 11 being visible in FIGS. 3 and 4).

The paddings 12, 22 each comprise a central inset 13, 23 having a substantially planar upper receiving face, as well as two convex-shaped side protrusions 14, 24 located on either side of the corresponding inset.

The padding 12 of the seat pad 11 further receives two vibrating warning devices 30, which are here arranged in the rear part of the central inset 13 on either side of the median longitudinal plane thereof.

Figure 2:
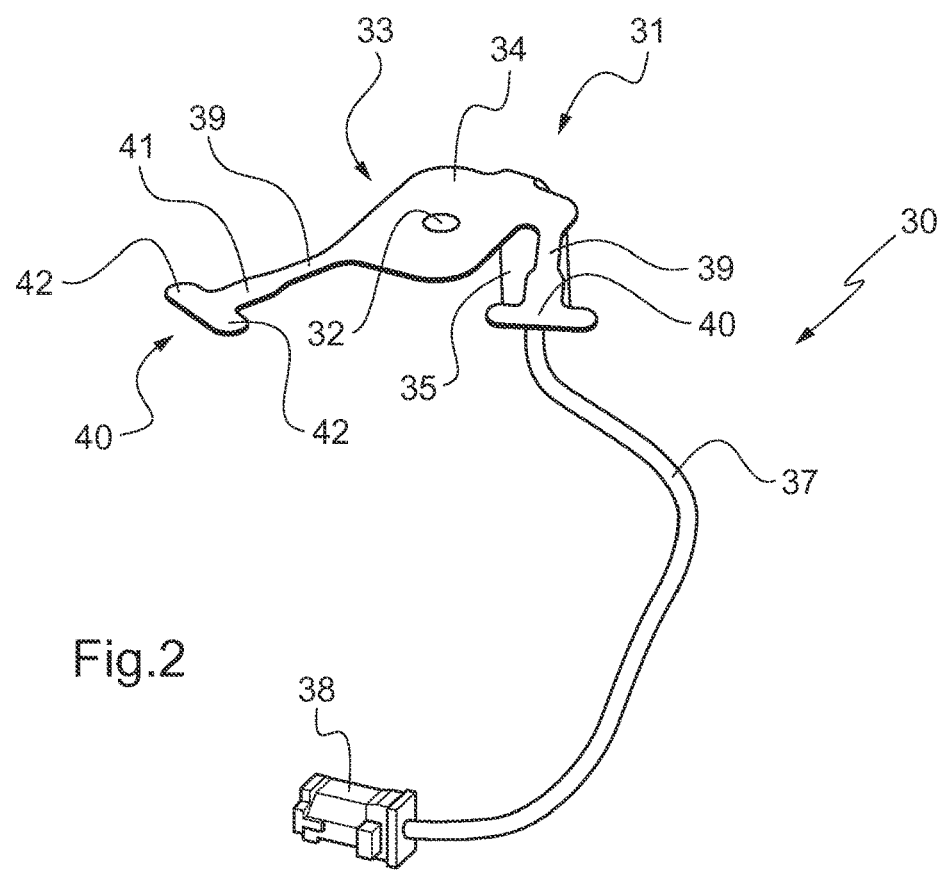
FIG. 2 is a perspective view of one of the two vibrating warning devices comprised by the seat pad of the seat of FIG. 1.

One of the warning devices will be described in detail with reference to FIG. 2, which shows the warning devices 30 in isolation.

The warning device 30 comprises a flexible vibrating patch 31 comprising in this instance a single electrically controlled vibratory actuator 32 of the LRA (linear resonant actuator) type, confined in a flexible plastic material support jacket 33 (see FIG. 3).

An LRA actuator is based on the same principle as a loudspeaker. It conventionally comprises a hollow external lozenge-shaped housing accommodating a wave spring, a movable mass integrating a coil head and a neodymium magnet, an acoustic coil, and a flexible printed circuit provided with an opening that receives this coil.

The acoustic coil, powered by an alternating current, produces a magnetic field that sets the neodymium magnet, and thus the movable mass, in motion. The contact between the wave spring and this movable mass generates a resonance effect that produces vibrations.

An actuator 32 of this type, the dimensions of which may vary as a function of the vibratory power thereof, usually has a thickness of between 2 and 3.5 mm for a diameter varying between 8 and 10 mm.

The rated operating voltage thereof is advantageously of between 2 and 4 V.

The support jacket 33 comprises a substantially rectangular main body 34 confining the actuator 32 and intended to come to rest against the upper face of the padding 12, as shown in FIG. 1.

This jacket 33 further comprises a cover 35 that extends in the extension of the main body 34 and that is provided to pass right through an opening 15 made in the thickness of this padding 12 (FIG. 3).

The cover 35 confines a plurality of conductors connecting the printed circuit of the actuator 32 to a power cable 37 intended to be installed under the padding 12 and carrying, on the end thereof opposite the cover 35, a connector 38 that enables connection of the warning device 30 to an electric control module (not shown in the drawings) that is installed in the vehicle.

This control module, associated with at least one sensor suitable for detecting particular events external or internal to the passenger compartment, is configured to send an electric signal to the warning device 30, leading to the vibration of the actuator 32 so as to warn the driver in order for him to react rapidly and appropriately.

Preferably, this control module, the detail of whose implementation is not relevant to the invention, is designed in such a way that the characteristics of the signal transmitted to the warning device can vary as a function of the information received from the sensor(s) so as to modulate the vibrating effect generated and to make the driver's reaction proportionate.

The jacket 33 further comprises two arms 39 extending from the main body 34, on either side thereof, and each arm comprising at the respective distal end thereof a retaining hook 40 intended to be introduced by force into a corresponding opening 16 made in the padding 12 to hold the main body 34 of the warning device 30 against the upper face of this padding 12 (see FIGS. 1 and 4).

Each retaining hook 40 has a T-shaped profile and comprises a central core 41 extending in the extension of a corresponding arm 39 as well as two side branches 42 projecting symmetrically from the free end of this core 41 on either side thereof.

As is shown in FIG. 4, each opening 16 made in the padding 12 has an overall pot shape and comprises a throttled upper portion suitable for engaging with the two side branches 42 of a hook 40 to retain the corresponding arm 39 of the vibrating device 30.

The jacket 33 is advantageously formed from two thermoplastic (for example polypropylene) films, cut to appropriate dimensions in advance and superimposed so as to sandwich the actuator 32, these two films subsequently being hot-pressed, advantageously by calendaring, to weld them together and to lead to the deformation thereof so as to create a housing confining this actuator 32.

To improve the comfort of the driver and to prevent the driver from being bothered by the presence of the patches 31, the main bodies 34, which accommodate the actuators 32, are sandwiched between the upper face of the padding 12 and the cover lining 17 of the seat pad 11, this cover lining 17 comprising an internal polyurethane foam layer 18 brought up against the lower face of the external surfacing 19 thereof made of (woven or non-woven) textile, leather or synthetic material.

This foam layer has a thickness of advantageously between 3 and 10 mm.

Figure 5:
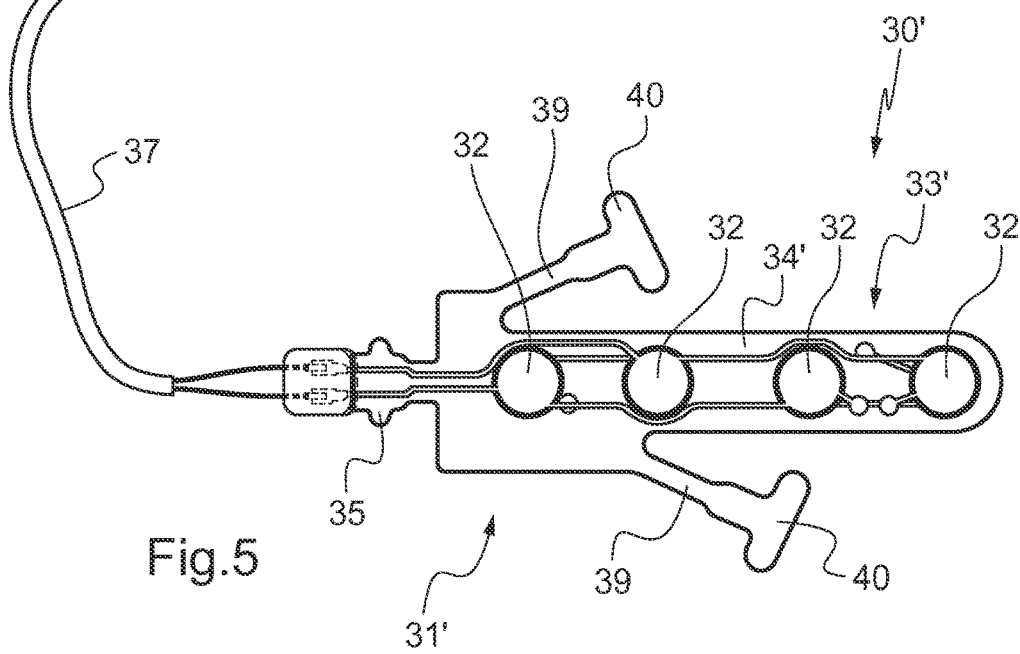
FIG. 5 is a view from above of a warning device according to a variant of the invention.

FIG. 5 shows an alternative warning device 30'.

In the following and in FIG. 5, like reference numerals are kept for the elements identical to the first embodiment of the warning device, and a prime is added for similar elements.

The warning device 30' is similar to the warning device 30 described above, except that the patch 31' comprises a plurality of actuators 32 (in this instance four) confined in the main body 34' of the jacket 33' thereof, these actuators 32 being aligned and electrically connected (in series and/or in parallel) by connectors.

The presence of a plurality of actuators 32 thus makes it possible to increase the vibratory power generated by the device 30'.

In variant embodiments (not shown), the number of actuators comprised by the warning device may be different (for example, equal to 2, 3 or 5), as may the arrangement thereof in the main body of the patch jacket.

In other variant embodiments (not shown), the vibratory actuator(s) are of the ERM (eccentric rotating mass actuator) type.

In yet other variant embodiments (not shown), the vibratory actuator(s) are of the EMP (electromechanical polymer actuator) type. Although they have a higher cost price, these have the advantage of being particularly fine (200 μm or less), making it possible, without a loss of comfort, to omit the layer of polyurethane foam brought up against the external lower face of the lining.

In yet other variant embodiments (not shown), the number and/or arrangement of the warning devices on the seat padding are different (it likewise being possible, for example, for the devices to be installed on the side protrusions).

It will further be noted that the backrest padding may also receive one or more warning devices.

In general, it will be recalled that the warning device is not limited to the embodiments described and shown, but encompasses any variant implementation within the grasp of a person skilled in the art.

The invention claimed is:

1. A vibrating warning device for a vehicle seat, having a vibrating patch intended to be fixed to the upper face of the padding of the seat or backrest of a said seat, said patch comprising at least one electrically controlled vibratory actuator accommodated in a flexible support jacket;
wherein said flexible support jacket has a main body enclosing said at least one vibratory actuator, and at least two arms extending from said main body, on either side of the body, and each arm comprising a retaining hook intended to be introduced into a corresponding recess made in said padding in order to keep said main body against the upper face of this padding.

2. The vibrating warning device according to claim 1, wherein each said retaining hook has a T-shaped profile and comprises a central core extending in the extension of a corresponding arm and two side branches projecting symmetrically from a free end of this core on either side thereof.

3. The vibrating warning device according to claim 1 wherein said jacket further comprises a cover extending in the extension of said main body provided to pass through an opening in said padding, said cover confining a plurality of conductors connecting said at least one vibratory actuator to a power cable intended to be installed under said padding.

4. The vibrating warning device according to claim 3, wherein said power cable carries, on the end thereof opposite said cover, a connector that enables connection of said warning device to an electric control module installed in said vehicle.

5. The vibrating warning device according to claim 1, wherein said jacket is formed of a thermoplastic material.

6. The vibrating warning device according to claim 5, wherein said jacket is made from two thermoplastic films, which are superimposed so as to sandwich said at least one vibratory actuator and hot-pressed to weld them together and cause them to deform so as to create a housing confining said at least one vibratory actuator.

7. The vibrating warning device according to claim 1, wherein said patch comprises a plurality of said vibratory actuators confined in said main body and electrically connected together in series and/or in parallel by connectors.

8. The vibrating warning device according to claim 1, wherein said at least one vibratory actuator is of the electromechanical polymer (EMP) type.

9. A pad of a seat or backrest of a vehicle seat comprising a padding covered with a cover lining, wherein said seat comprises said at least one warning device of claim 1, wherein the main body of said patch is sandwiched between the upper face of said padding and said lining cover, said padding further having a plurality of recesses each engaging with one said retaining hook to hold said main body against the upper face of said padding.

10. The pad of a seat or backrest according to claim 9, wherein said cover lining comprises an external surfacing and an internal foam layer brought up against the lower face of said external surfacing.

* * * * *